(12) United States Patent
Fox

(10) Patent No.: US 6,442,918 B1
(45) Date of Patent: Sep. 3, 2002

(54) ADJUSTMENT OF A PICKUP REEL OF A CROP HARVESTING HEADER

(75) Inventor: Thomas Russell Fox, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 09/677,380

(22) Filed: Sep. 27, 2000

(51) Int. Cl.$^7$ ............................................. A01D 57/04
(52) U.S. Cl. .......................................... 56/221; 56/220
(58) Field of Search ......................... 56/220, 222, 221, 56/223, 224, 225, 226, 364, 227

(56) References Cited

U.S. PATENT DOCUMENTS

| | | | |
|---|---|---|---|
| 4,751,809 A | | 6/1988 | Fox et al. |
| 4,776,155 A | | 10/1988 | Fox et al. |
| 4,800,711 A | * | 1/1989 | Hurlburt et al. |
| 4,835,953 A | * | 6/1989 | Naaktgeboren et al. |
| 5,261,216 A | * | 11/1993 | Schumacher, II et al. |
| 5,768,870 A | | 6/1998 | Talbot et al. |

* cited by examiner

Primary Examiner—Thomas B. Will
Assistant Examiner—Meredith C. Petravick
(74) Attorney, Agent, or Firm—Adrian D. Battison; Michael R. Williams; Ryan W. Dupuis

(57) ABSTRACT

A crop harvesting header includes a reel mounted on a pair of forwardly and downwardly extending arms carried on a header frame above a table and cutting knife. The reel is rotatable about a longitudinal axis and includes angularly bats. The arms can be raised and lowered by hydraulic cylinders to raise and lower the reel. A linkage including a cable and bell crank is provided which is responsive to the forward and downward sliding movement of the main elongate beam along the support arms for simultaneously and automatically causing a raising movement of the reel support arms. The cable is slack over a rearward part of the movement so that no lifting occurs. The linkage is arranged relative to a forward and downward slope of the arms such that, over the forward part of the movement, the beam moves substantially horizontally to cause the reel to move forwardly of the knife without moving downwardly into engagement with the ground, for operating with the knife at ground level. The linkage is arranged to be readily disengageable by disconnecting the cable such that, when disengaged, the reel support arms are not raised as the beam undergoes the forward sliding movement for operating where the knife is raised above the ground.

13 Claims, 8 Drawing Sheets

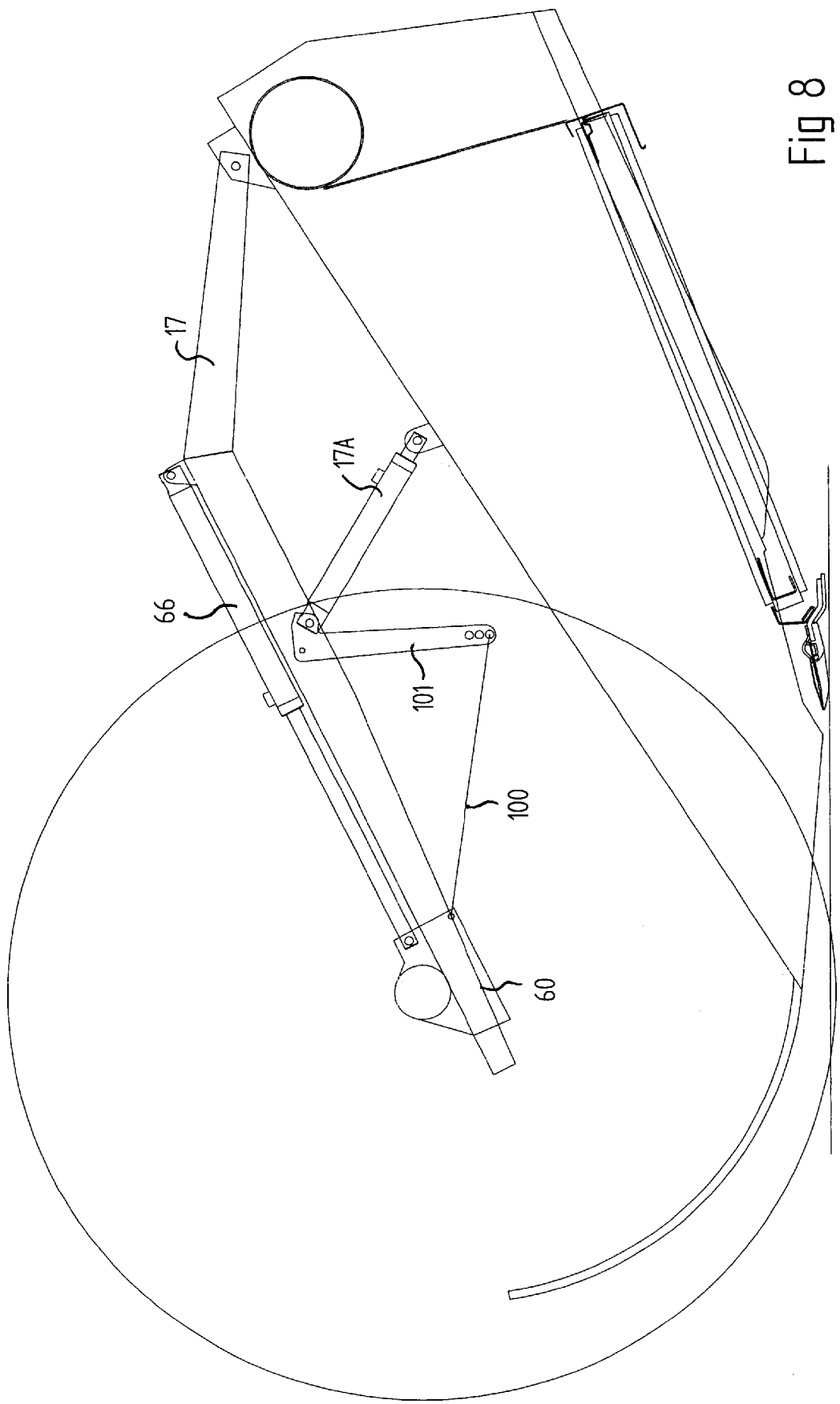

ADJUSTMENT OF A PICKUP REEL OF A CROP HARVESTING HEADER

This invention relates to a crop harvesting header of the type comprising a frame for mounting on a crop harvesting machine for movement across ground carrying a crop to be harvested, the frame defining a working width of the header, a table mounted on the frame across the width of the header for receiving the crop when cut for transportation along the header, a cutting knife along a front edge of the table for cutting the crop and a pickup reel comprising a main elongate support beam, a plurality of bats at angularly spaced positions around the main beam, a pair of support arms carried on the frame and extending forwardly therefrom for supporting the beam at a forward end of the arms and means for adjusting the position of the main longitudinal axis of the beam and relative to the cutter knife for different crop conditions.

BACKGROUND OF THE INVENTION

A reel of this type is shown in U.S. Pat. Nos. 5,768,870–4, 776,155 and 4,751,809 all of which are assigned to the present assignee.

The second of the above patents is particularly directed to the bat angle adjustment system which controls the angle of the bats as they rotate about the main longitudinal axis of the beam so as to maintain an angle of the bats relative to a vertical plane through the bat substantially constant as the bats move through the region adjacent the cutting knife. This bat control system includes an eccentrically mounted control disc which is shaped and arranged to provide the necessary advancement and retardation of the fingers of the bat as the bat rotates about the main longitudinal axis of the beam.

The first of the above patents shows that it is well known that the reel is adjustable so as to vary the height of the reel by pivoting the support arms about their point of connection to the frame. Furthermore the position of the reel along the length of the support arms is adjustable so as to move the reel and particularly the bats forwardly and rearwardly relative to the cutting knife for different crop conditions. Yet further, it is also possible to adjust the angle of the fingers, relative to a vertical plane passing through each bat axis, which is maintained constant as the bat passes through an arc adjacent the knife.

The slope of the main part of the reel support arm is arranged generally parallel to the slope of the table and draper from the knife so that the height of the reel above the cutter bar and draper is controlled by the slope during the fore and aft movement in order that the reel does not contact the knife and cutter-bar or the draper conveyor as the reel is moved fore aft.

However, when cutting with the knife off the ground (for example rice) it is desirable to move the reel forward of the knife and downwardly in front of the knife to pick up the rice and leave as much of the wet stem on the ground as possible.

To the contrary, when cutting with the knife on the ground (soybeans) the reel is moved forward to pick up down plants ahead of the cutter-bar. It is then necessary to raise the reel to prevent the reel from contacting the ground and possibly damaging the reel or breaking fingers.

These two controls of the fore and aft movement and the height of the reel are independently operable by the operator who then has the responsibility of ensuring that the reel takes up the required position for the most efficient harvesting of the crops concerned.

SUMMARY OF THE INVENTION

It is one object of the present invention to provide an improved header which allows the position of the reel on the header relative to the knife to be adjusted more effectively.

According to one aspect of the invention there is provided a crop harvesting header comprising:
  a frame for mounting on a crop harvesting machine for movement across ground carrying a crop to be harvested, the frame defining a working width of the header;
  a table mounted on the frame across the width of the header for receiving the crop when cut for transportation along the header;
  a cutting knife along a front edge of the table for cutting the crop;
  and a pickup reel comprising:
    a main elongate beam extending along the header generally parallel to the cutting knife;
    at least two reel support arms spaced along the width of the frame, each having a rear end mounted on the frame for vertical pivotal movement providing adjustment for raising and lowering the reel relative to the cutting knife and a forward end for supporting the main elongate beam;
    means mounting the main beam for rotation about a main longitudinal axis thereof;
    a plurality of elongate bats;
    means mounting the bats at angularly spaced positions around the main elongate beam for rotation therewith;
    beam support members mounting the main elongate beam on the support arms for sliding adjustment movement forwardly and rearwardly on the support arms so as to adjust the horizontal position of the beam relative to the cutting knife;
    and a linkage responsive to the forward sliding movement of the main elongate beam along the support arms for simultaneously and automatically causing a raising movement of the reel support arms.

Preferably the linkage is arranged to effect the raising movement only over a forward part of the sliding movement beyond a predetermined position and not over a part of the sliding movement rearward of the predetermined position. In this way the reel follows the slope of the arms behind the predetermined position so as to follow the slope of the table down to the knife and in front of the knife the arms are raised as the reel moves forwardly.

Preferably the linkage is arranged to be readily disengageable and re-engageable such that, when disengaged the reel support arms are not raised as the beam undergoes the forward sliding movement. In this way, the reel can continue to follow the slope of the arms downwardly and forwardly as it moves in front of the knife for use in crop where the knife is raised and the bats need to move downwardly to a position in front of and below the height of the knife.

Preferably the linkage is arranged relative to the forward and downward slope of the arms such that the beam moves in the forward part substantially horizontally so as to follow the ground.

Preferably the arms are straight so as to define a constant slope forwardly and downwardly since this avoids undesirable changes in finger angle of the bats as explained in the above prior patent.

Preferably each arm is lifted by an actuator having a first end connected to the frame and a second end connected to the arm and wherein the linkage includes a member connected between one of the first and second ends and the respective one of the frame and the arm so as to increase the effective length of the actuator. This is one simple way to effect the movement but it will be appreciated that many alternative arrangements can be designed to fulfil this function. Other mechanical linkages could be provided or even hydraulic coupling arrangements could be used to effect the function of automatically raising the arms as the beam moves forward beyond the predetermined location which is aligned with the knife.

In the above example, the member connected between one of the first and second ends and the respective one of the frame and the arm is a bell crank.

Preferably the linkage includes a cable which is slack rearward of the predetermined position and becomes tensioned at the predetermined position.

According to a second more limited definition of the invention there is provided a crop harvesting header comprising:

a frame for mounting on a crop harvesting machine for movement across ground carrying a crop to be harvested, the frame defining a working width of the header;

a table mounted on the frame across the width of the header for receiving the crop when cut for transportation along the header;

a cutting knife along a front edge of the table for cutting the crop;

and a pickup reel comprising:

a main elongate beam extending along the header generally parallel to the cutting knife;

at least two reel support arms spaced along the width of the frame, each having a rear end mounted on the frame for vertical pivotal movement providing adjustment for raising and lowering the reel relative to the cutting knife and a forward end for supporting the main elongate beam;

means mounting the main beam for rotation about a main longitudinal axis thereof;

a plurality of elongate bats;

means mounting the bats at angularly spaced positions around the main elongate beam for rotation therewith;

beam support members mounting the main elongate beam on the support arms for sliding adjustment movement forwardly and rearwardly on the support arms so as to adjust the horizontal position of the beam relative to the cutting knife;

the support arms having a forward and downward slope such that the beam moves downwardly as it slides forwardly;

and a linkage responsive to the forward and downward sliding movement of the main elongate beam along the support arms for simultaneously and automatically causing a raising movement of the reel support arms only over a forward part of the sliding movement beyond a predetermined position;

the linkage being arranged not to effect the raising movement over a part of the sliding movement rearward of the predetermined position;

the linkage being arranged relative to a forward and downward slope of the arms such that, over the forward part of the movement, the beam moves substantially horizontally;

the linkage being arranged to be readily dis-engageable and re-engageable such that, when disengaged the reel support arms are not raised as the beam undergoes the forward sliding movement.

BRIEF DESCRIPTION OF THE DRAWINGS

One embodiment of the invention will now be described in conjunction with the accompanying drawings in which:

FIGS. 6, 7 and 8 are side elevational views of the header according to the present invention showing the reel respectively at the predetermined mid position, in the rearward or retracted position and in the forward position.

In the drawings like characters of reference indicate corresponding parts in the different figures.

DETAILED DESCRIPTION

Figure 1:
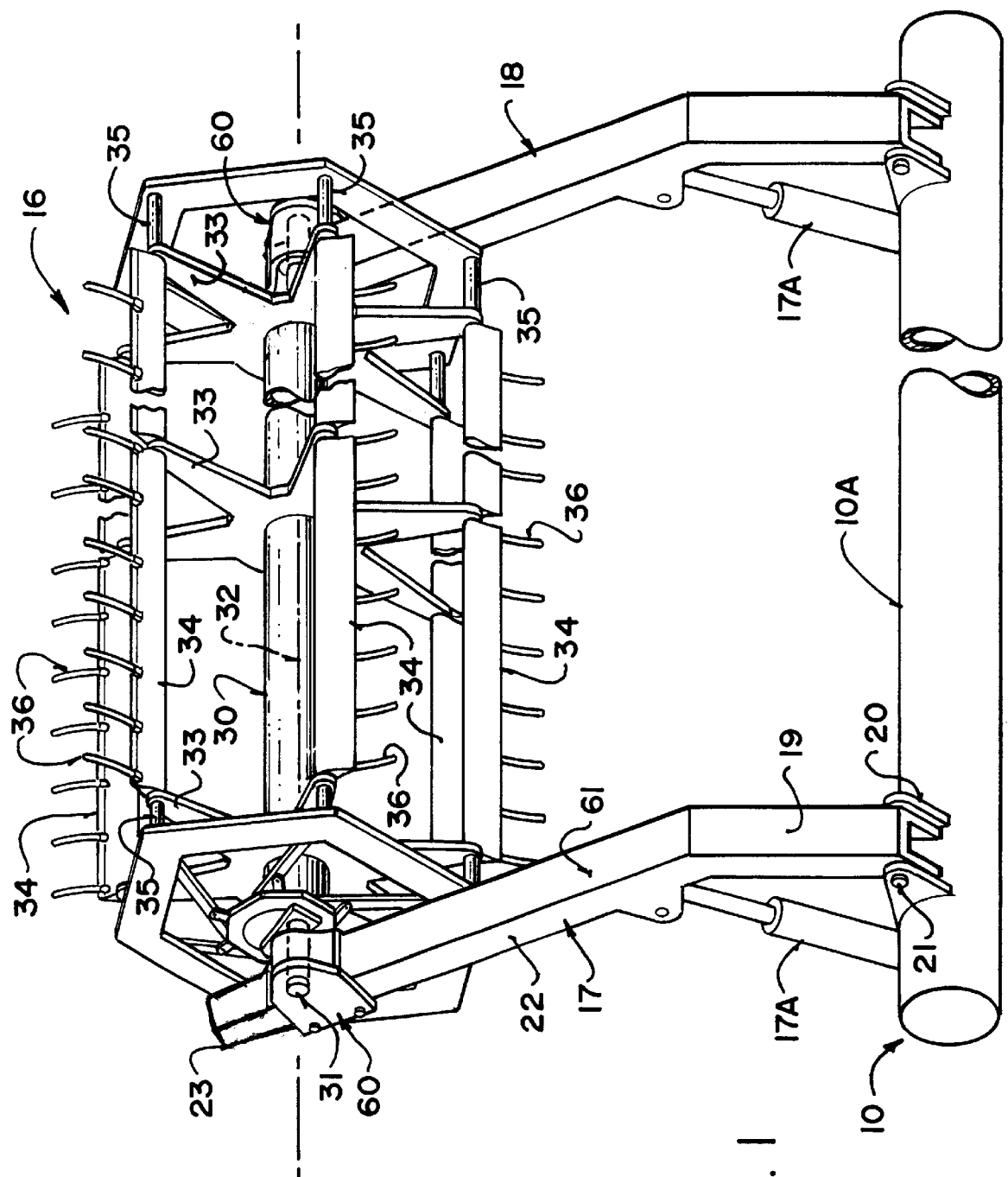
FIG. 1 is a schematic illustration taken from U.S. Pat. No. 5,768,870 issued Jun. 23, 1998 of a pickup reel of the type to which the present invention relates showing the reel and the support arms therefor.
Figure 2:
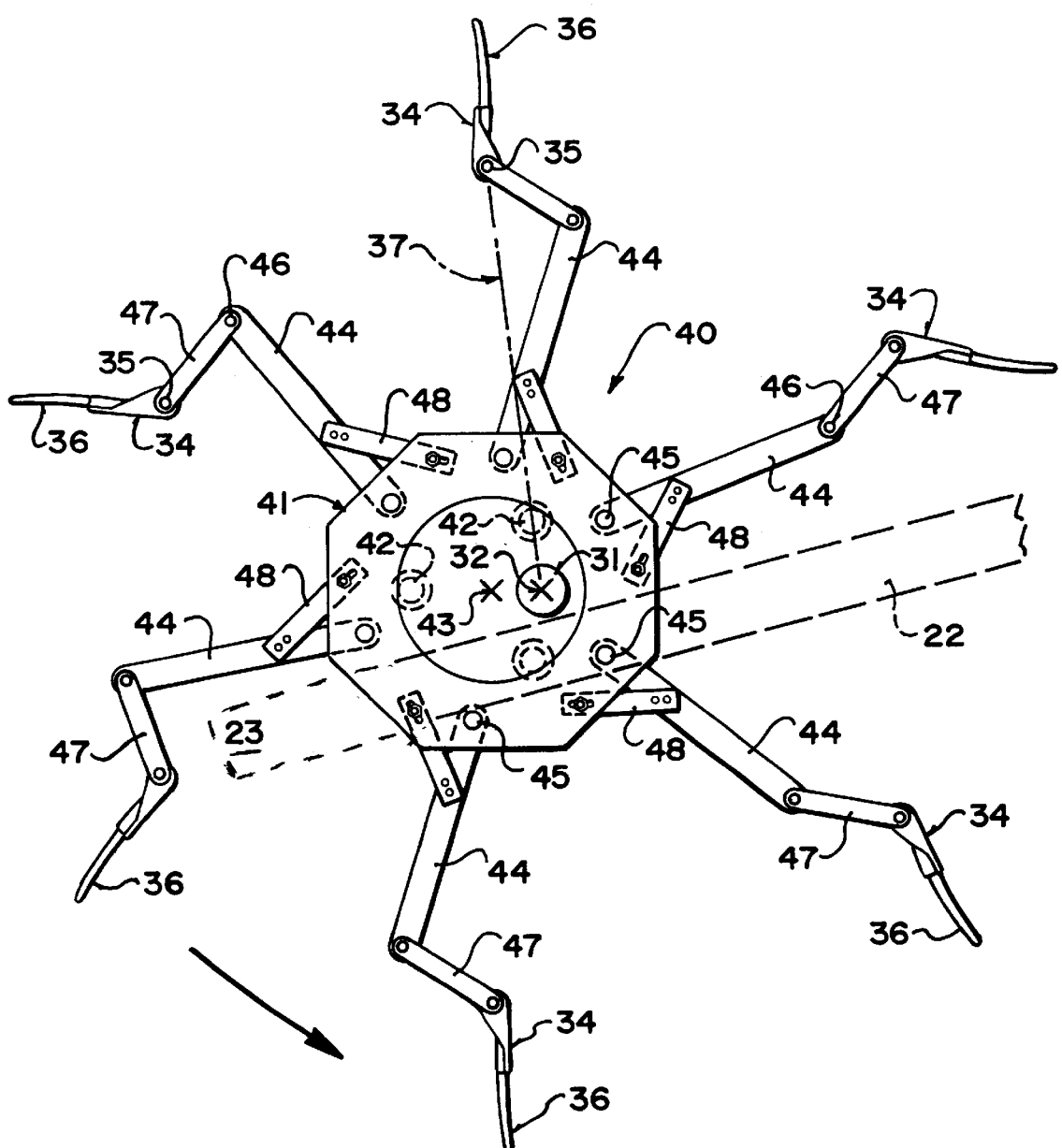
FIG. 2 is a vertical cross sectional view through the bat angle control system of the reel of FIG. 1.
Figure 3:
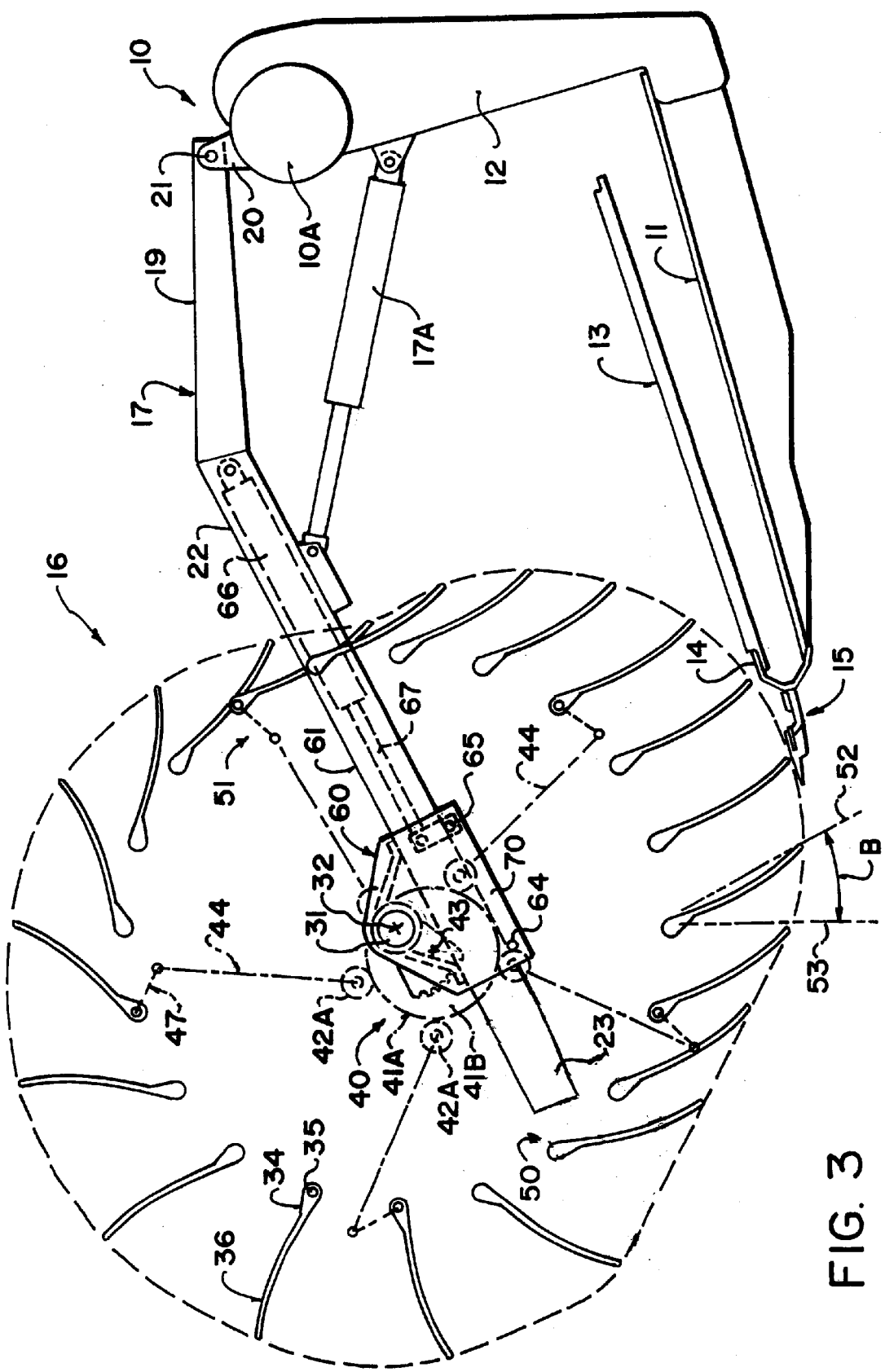
FIG. 3 is a side elevation view of the header according to the present invention in a retracted position of the reel axis relative to the support arm pivot, the at angle control system being modified relative to that of FIG. 2.

FIGS. 1, 2 and 3 show schematically the general layout of the header of the type to which the present invention relates. Thus the header comprises a main frame generally indicated at 10 including a main longitudinal beam which extends across the full width of the frame and defines the width of the header. The frame further includes a table 11 which is mounted downwardly and forwardly of the main tube 10A and supported on the main tube by a plurality of braces 12 (omitted in FIG. 1 for convenience of illustration). On top of the table 11 is mounted a draper or other conveyor 13 which carries the cut crop material along the header for discharge. At the front of the table is provided a knife support bracket 14 in the form of a generally U-shaped channel facing forwardly of the table. On the bracket 14 is mounted a sickle knife 15 which extends across the full width of the table and acts to cut a standing crop as the header is moved across the ground carrying the crop.

The construction of the reel is also substantially the same as that shown and described in U.S. Pat. No. 4,776,155 of the present Assignees and a part of FIG. 2 herein is taken from that patent for convenience of illustration and to provide a brief description of the construction of the reel. However the reel can vary in design and is well known to one skilled in the art and therefore will not be described in full detail.

The reel comprises a main elongate beam 30 in the form of a cylindrical tube which is mounted on an axle 31 which is mounted so as to allow rotation of the beam 30 about a main longitudinal axis 32 of the beam. The beam carries a plurality of star shaped support elements 33 at spaced positions along the length of the beam with each support element having a number of arms equal to a number of bats 34 carried by the main beam 30. Each bat includes a support shaft 35 which is mounted in a bearing at the end of a respective arms. On the shaft is mounted a bat comprising an elongate body which supports a number of fingers 36 at longitudinally spaced positions along the length of the bat which project from the bat generally outwardly away from the axis 32.

The bat shafts 35 and their longitudinal axis thus rotate about the axis 32. At the same time each bat pivots about its respective shaft 35 so as to provide a variation in the angle of the fingers 36 relative to an axial plane 37 joining the axis 32 and the shaft 35. The intention in the movement is to maintain the bat fingers mutually parallel at least as they move through the working zone in which they contact the crop and more preferably throughout the full rotation around the reel axis. In order to achieve this, it is of course necessary that the bat fingers constantly adjust in angle relative to the axial plane passing through the respective bat axis.

The control in the movement of the bats is provided by an eccentric drive system generally indicated at 40. In FIGS. 1 and 2, the eccentric drive system comprises a disc 41 carried on a plurality of cams 42 which are located eccentrically relative to the axis 32 on a suitable support member. The disc 41 is thus free to rotate around its axis 43 which is offset from the axis 32. The disc carries a plurality of links 44 which extends from a pivot pin 45 on the disc to a pivot coupling 46 at an inner end of a bat pivot arm 47 rigidly connected to the bat for rotation therewith. Thus each link 44 pulls and pushes on the arm 47 of the respective bat to pivot the bat about its shaft 35.

In FIG. 2 the star-shaped supports 23 are omitted for convenience of illustration. In FIG. 3 the links and bat crank arms 47 are omitted for convenience of illustration. Tie links 48 are connected between each link 44 and the disc so as to hold the link against forward and rearward movements beyond predetermined limits with the links 48 having a slot shaped connection to the disc allowing a change of angle of the link relative to the disc to accommodate the movement of the bats.

As previously described in the above patent, this bat angle control system generally indicated at 40 provides advancement and retardation of the angle of the fingers 36 at different positions around the axis 11. In FIG. 2, the bat control system includes the rotating disk 41 mounted on the plurality of guide rollers 42 so that the disk in effect forms a rotating cam mounted on stationary cam followers defined by the rollers. In FIG. 3, the arrangement is in effect reversed in that a stationary cam guides rotating cam followers 41A with those cam followers or rollers acting to drive the links 44 and 47 (shown only schematically).

FIG. 3 shows the different angles of the bats at twenty positions around the axis 32. The number of bats can vary but generally a pickup of this type will have a number of bats of the order of five or six. In FIGS. 1 and 3 five such bats are shown. In FIG. 2, six bats are shown.

It will be noted therefore from FIG. 3 that the eccentric location of the axis 43 of the cam 41A causes the fingers to be at a maximum advanced position at the position indicated at 50 and that a maximum retarded position at the position indicated at 51. In between these positions the fingers remain substantially parallel as the bats move or sweep between these two positions. Thus it will be noted that the bats have an angle B as indicated at the line 52 relative to a vertical plane 53 extending through the bat at each position around its movement. The angle B remains substantially constant between the positions 50 and 51. The position 50 is located forwardly of the knife 15 and the position 51 is rearward of the position 50 and generally rearward of the knife 15.

Each end of the shaft 31 is mounted in a bearing 32A. The cam 41A includes a flat disk 41B which is circular and is carried on bearing 32A so as to remain stationary as the shaft 31 rotates, the disk 41 B being attached to the bearing 32A via an adjustment plate 54 fixed to the bearing. The position of the cam 41A relative to the axis 32 of the shaft 31 can be adjusted manually by rotating the adjustment plate 54 relative to the disk 41B. Thus the cam 41A is rotated about the axis 32 by selecting one of the slots in the plate 54 and locating a pin in that selected slot to hold the disk 41B connected to the plate 54 in fixed position when the adjustment is complete. This adjustment, which is a manual adjustment and intended to be effected prior to entry into the field with the equipment, adjusts the angular orientation of the bat angle control system 40 about the axis 32. This adjustment therefore varies the locations of the positions 50 and 51 and also varies the angles B of the fingers as they sweep over the area of the cutting knife.

The pickup reel 16 is carried on the main frame 10 by a pair of forwardly extending arms 17 and 18 which support the pick up reel in position generally above the knife 15. The support arms 17 and 18 are pivoted at their rear end 19 on the main tube 10A by a pair of devises 20 and a transverse pin 21 with the pivotal movement being effected by a pair of hydraulic cylinders 17A.

Each of the arms 17 and 18 includes the rear generally horizontal coupling portion 19 which connects to the support frame and a main forwardly and downwardly inclined portion 22.

The support arm 17 defines a support surface for a slide member 60 movable along the support arm. As illustrated the support surface is defined by an upper surface 61 of an inverted channel member defining the support arm. The slide member 60 is thus supported on the upper surface 61 so the weight of the reel is applied through the slide plate 60 onto the upper support surface 61.

Figure 4:
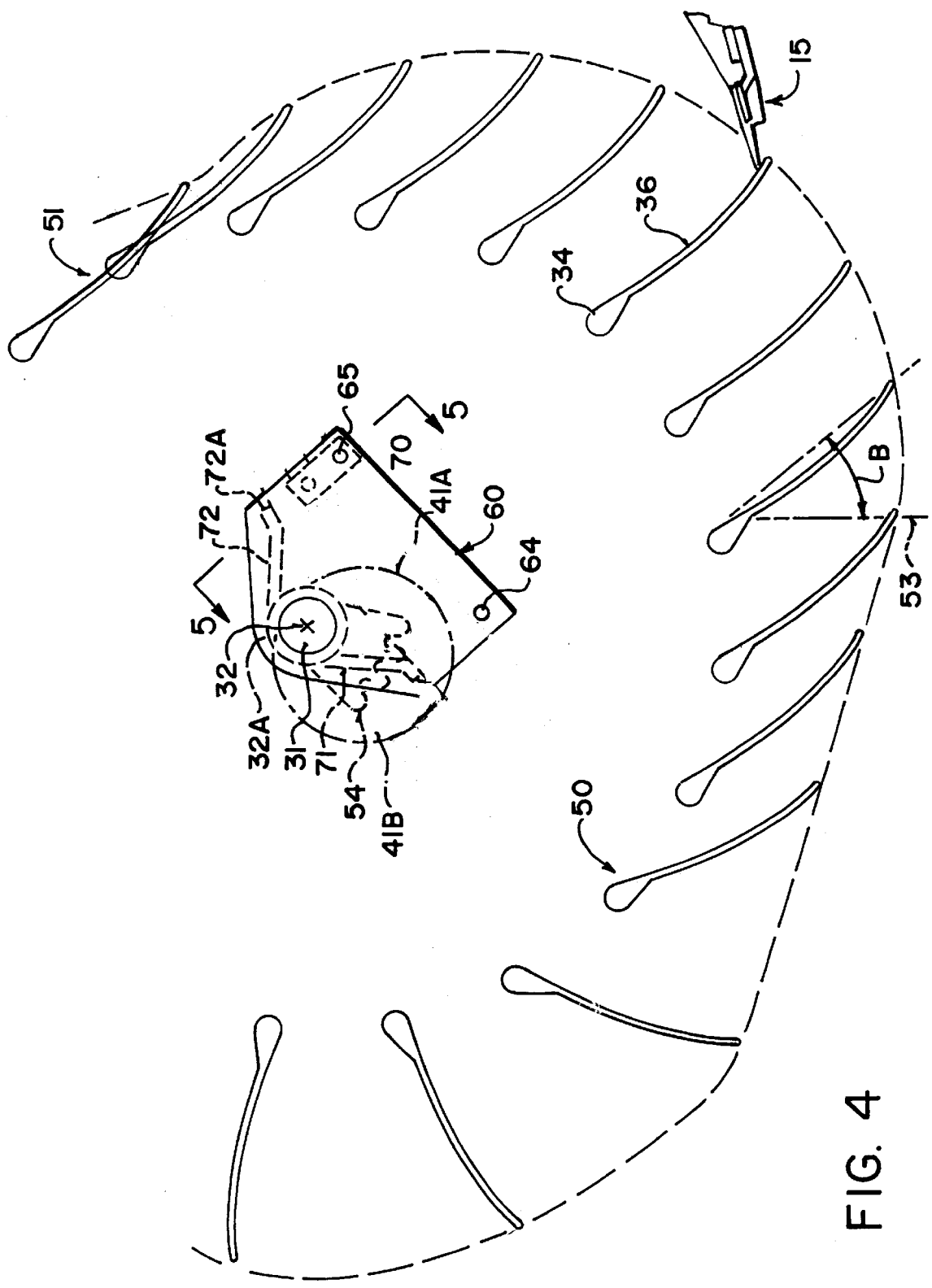
FIG. 4 is a partial side elevational view similar to that of FIG. 3 showing the reel axis in a forward position relative to the support arm pivot in which the axis is moved forwardly and downwardly and the finger angle is increased.
Figure 5:
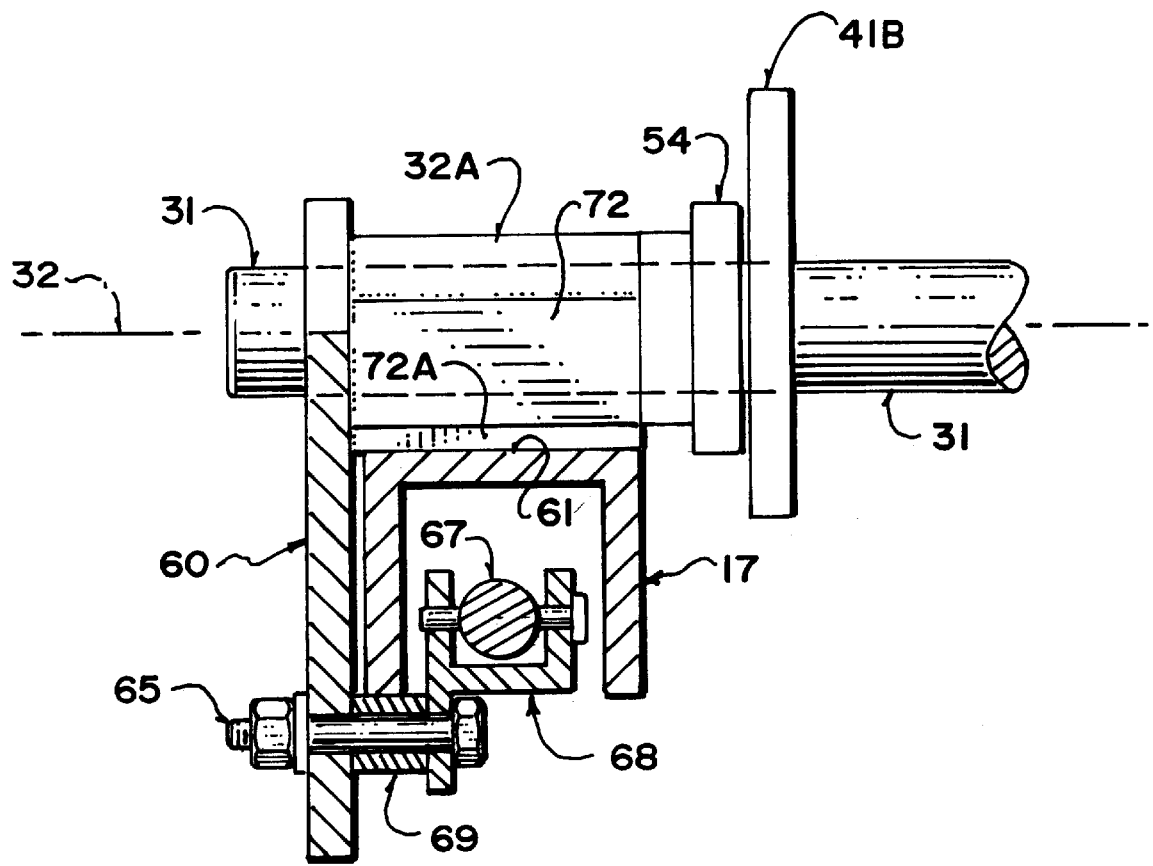
FIG. 5 is a cross-sectional view along the lines 5—5 of FIG. 4.

As best shown in FIGS. 4 and 5, the slide member 60 comprises an end plate 70 which forms a vertical plate parallel to one side wall of the channel member forming the respective support arm. The plate 70 carries on its inside surface the bearing 32A for the shaft 31 So that the shaft 32 projects through a hole in the plate above the support surface 61 of the support arm. The bearing 32A is carried in a pair of support plates 71 and 72 which have an upper end attached to the bearing 32A and extend downwardly and outwardly therefrom to form lower curved ends 71A and 72A which sit on the top surface 61 of the support arm. Thus the lower end 71A of the plate 71 is positioned forwardly of the axis 32 of the shaft 31 and the lower end 72A of the plate 72 is positioned rearwardly of the axis 32. These lower ends therefore provide support points for resting on the surface 61 and communicating forces from the bearing and the plate 70 downwardly onto the support surface 61.

The slide member defines a forward contact point 71A and a rearward contact point 72A which define points of engagement with the support surface 61. Two retaining pins 64, 65 located underneath the support arm hold the structure in position on the support arm. The slide member thus provides two top points of contact with the support arm with the orientation of the slide member being controlled by the height of the contact points on the side member.

The support surface 61 is defined along a major part of the main portion 22 of the arm and also along an upper surface of the downwardly inclined forwardmost portion 23 of the arm. The slide member is moved forwardly and rearwardly by a hydraulic cylinder 66 with a piston rod 67 located on the support arm within the channel shape for engaging and sliding the slide member along the support arm. The end of the rod 67 is attached to the pin 65 by a clevis 68 and the pin 65 carries a bushing 69 to run against the underside of the support arm 17. It will be appreciated that each of the arms includes a slide member 60 substantially of the arrangement described above. In one arrangement, both slide members include a cam 41A and related elements as described. In another arrangement, the cam is located only at one side and the opposed slide member is thus less complicated but still acts to support the bearing as described. In this arrangement, the drive to the shaft (not shown) can be located at the opposed end.

The position of the reel can then be adjusted in the field condition by actuating the cylinder 66 to move the slide member forwardly and rearwardly. As the slide member moves forwardly and rearwardly over the main portion 22 of the arm, the slide member follows the upper support surface 61 so that it is moved forwardly and downwardly as it slides along the main portion. The angle of the main portion 22 is arranged to follow approximately the angle of the table including the draper 13 so that the fingers remain at a constant spacing from the table up to the knife 15.

Figure 6:
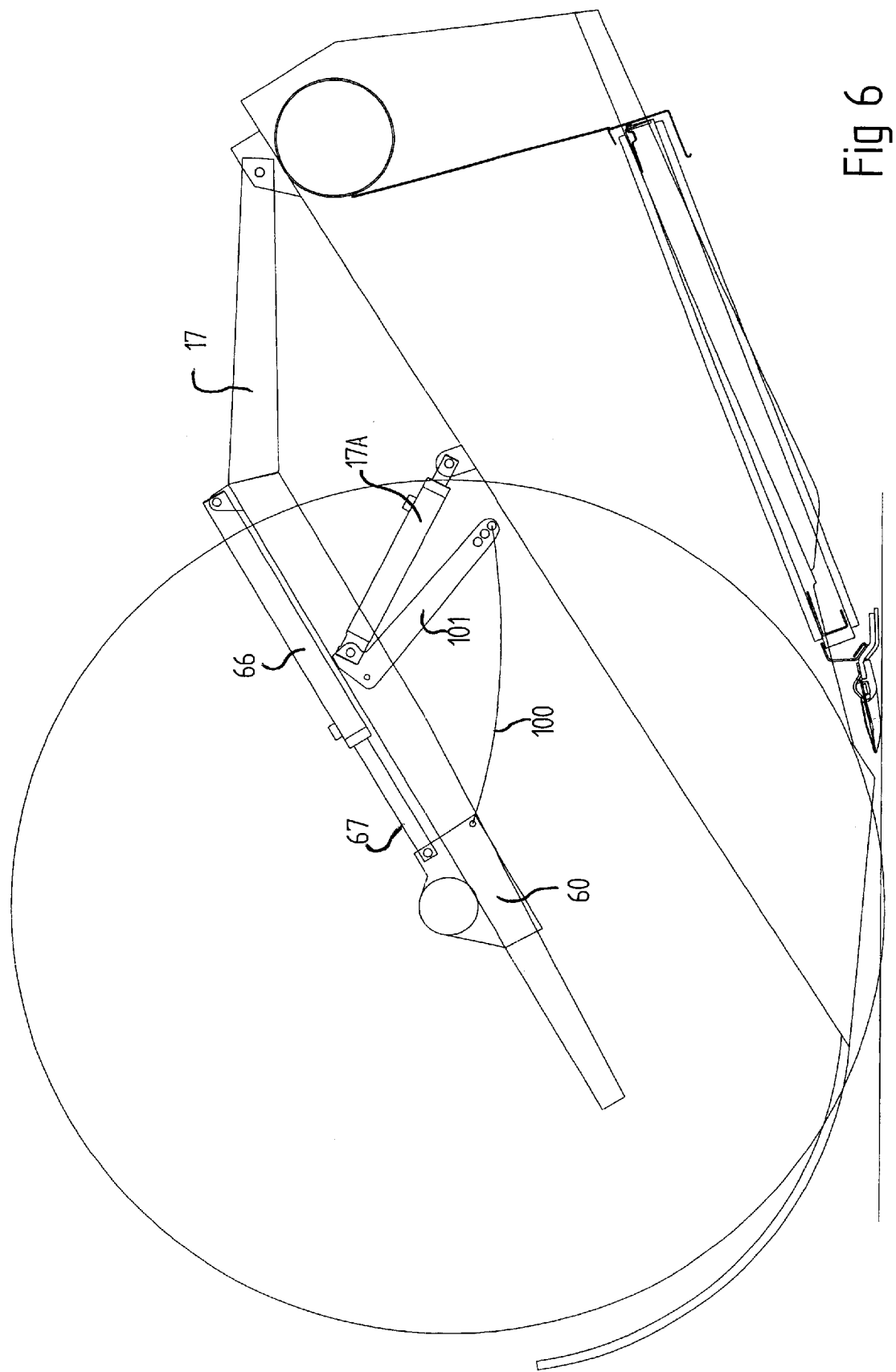
Figure 7:
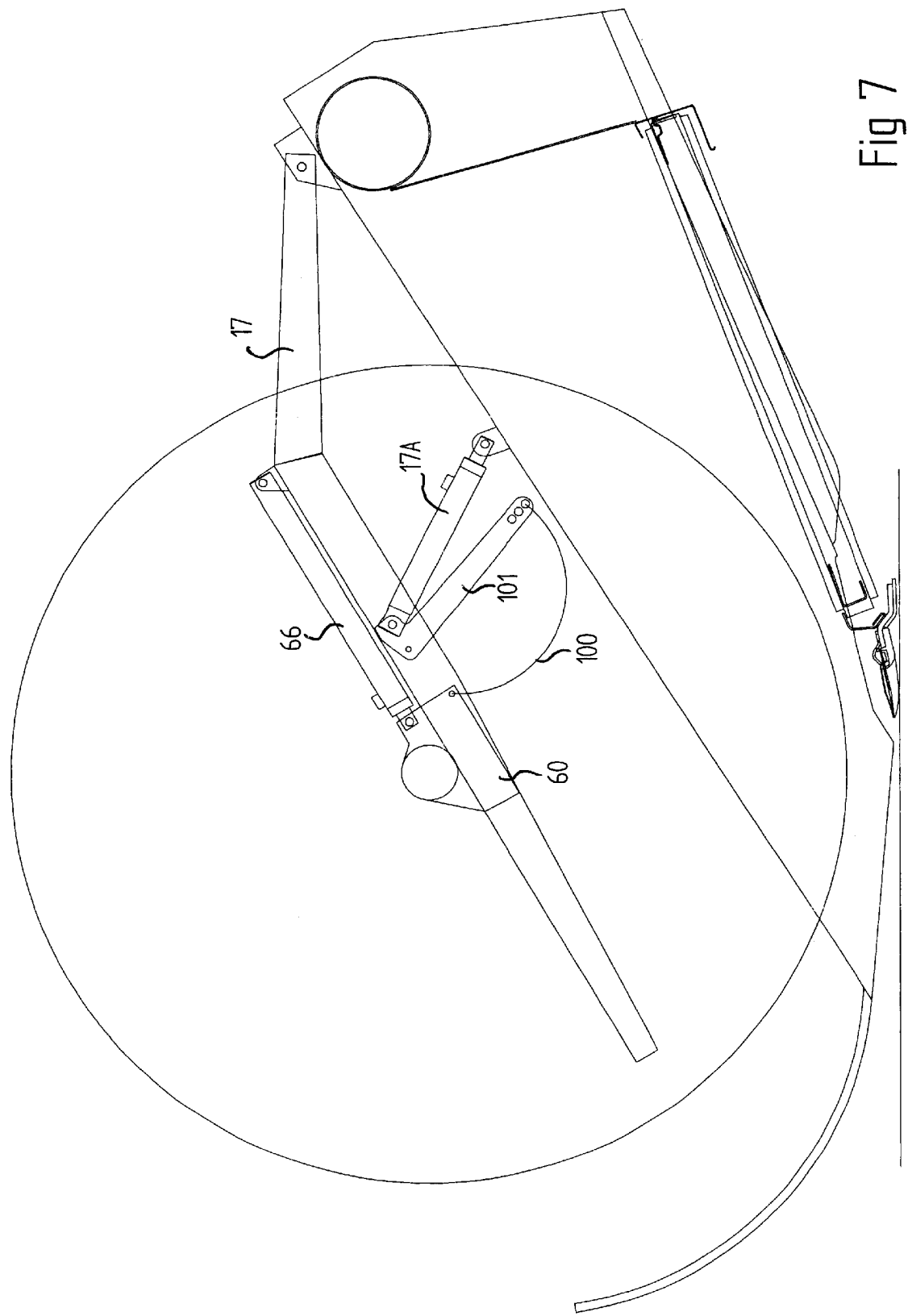

In FIGS. 6, 7 and 8 there is shown the arrangement of the present invention in which there is provided a linkage between the slide member 60 and the cylinder 17A. In the example shown, this comprises a cable (or other flexible element) 100 which pulls on a bell crank 101. The end of the bell crank is located between the upper end of the cylinder and the arm 17 so that pulling on the cable acts to increase the effective length of the cylinder 17A and thus raise the arm 17.

In FIG. 7 showing the retracted position of the reel and in movement of the reel up to a predetermined position above the knife, the cable is slack so that the bell crank remains in its rest position with the arm not raised. Thus the reel moves through the same height above the cutter bar and conveyor as when the reel is over the header.

However, as the reel is pushed forward of the predetermined position above cutter bar shown in FIG. 6, the cable pulls on the bell crank and simultaneously and automatically acts to raise the support arm at a rate relative to the forward movement along the support arm so that the reel moves substantially horizontally, that is parallel to the ground, as shown in FIG. 8.

This is required when cutting crops with the cutter-bar on the ground since otherwise the reel fingers could come into contact with the ground causing potential damage.

The slope of the reel support arm controls the height of the reel above the cutter bar and draper so that the reel does not contact the cutter-bar or conveyor as the reel is moved fore and aft. When cutting off the ground (for example for harvesting rice) the reel is moved forward and down to pick up the rice and leave as much of the wet stem on the ground as possible. When cutting on the ground (for example when harvesting soybeans) the reel is moved forward to pick up down plants ahead of the cutter-bar. It is then necessary to raise the reel to prevent the reel from contacting the ground and possibly damaging the reel or breaking fingers.

The present invention allows the reel to follow the slope of the reel support arm as it moves forward, but raises the support arm before the reel contacts the ground. The reel moves forward approximately parallel to the ground ahead of the cutter-bar. This allows the same support arm to be used for all crops. The raising means provided by the cable can be simply and readily disconnected for rice and reconnected for soybeans.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:
    a frame for mounting on a crop harvesting machine for movement across ground carrying a crop to be harvested, the frame defining a working width of the header;
    a table mounted on the frame across the width of the header for receiving the crop when cut for transportation along the header;
    a cutting knife along a front edge of the table for cutting the crop;
    and a pickup reel comprising:
        a main elongate beam extending along the header generally parallel to the cutting knife;
        at least two reel support arms spaced along the width of the frame, each having a rear end mounted on the frame for vertical pivotal movement providing adjustment for raising and lowering the reel relative to the cutting knife and a forward end for supporting the main elongate beam;
        means mounting the main beam for rotation about a main longitudinal axis thereof;
        a plurality of elongate bats;
        means mounting the bats at angularly spaced positions around the main elongate beam for rotation therewith;
        beam support members mounting the main elongate beam on the support arms for sliding adjustment movement forwardly and rearwardly on the support arms so as to adjust the horizontal position of the beam relative to the cutting knife;
        and a linkage responsive to the forward sliding movement of the main elongate beam along the support arms for simultaneously and automatically causing a raising movement of the reel support arms.

2. The header according to claim 1 wherein the linkage is arranged to effect the raising movement only over a forward part of the sliding movement beyond a predetermined position and not over a part of the sliding movement rearward of the predetermined position.

3. The header according to claim 1 wherein the linkage is arranged to be readily dis-engageable and re-engageable such that, when disengaged the reel support arms are not raised as the beam undergoes the forward sliding movement.

4. The header according to claim 1 wherein linkage is arranged relative to a forward and downward slope of the arms such that the beam moves substantially horizontally.

5. The header according to claim 4 wherein the arms are straight so as to define a constant slope forwardly and downwardly.

6. The header according to claim 1 wherein each arm is lifted by an actuator having a first end connected to the frame and a second end connected to the arm and wherein the linkage includes a member connected between the second end and the arm so as to increase the effective length of the actuator.

7. The header according to claim 6 wherein the member connected between the second end and the arm is a bell crank.

8. The header according to claim 2 wherein the linkage includes a cable which is slack rearward of the predetermined position and becomes tensioned at the predetermined position.

9. A crop harvesting header comprising:
    a frame for mounting on a crop harvesting machine for movement across ground carrying a crop to be harvested, the frame defining a working width of the header;

a table mounted on the frame across the width of the header for receiving the crop when cut for transportation along the header;

a cutting knife along a front edge of the table for cutting the crop;

and a pickup reel comprising:
- a main elongate beam extending along the header generally parallel to the cutting knife;
- at least two reel support arms spaced along the width of the frame, each having a rear end mounted on the frame for vertical pivotal movement providing adjustment for raising and lowering the reel relative to the cutting knife and a forward end for supporting the main elongate beam;
- means mounting the main beam for rotation about a main longitudinal axis thereof;
- a plurality of elongate bats;
- means mounting the bats at angularly spaced positions around the main elongate beam for rotation therewith;
- beam support members mounting the main elongate beam on the support arms for sliding adjustment movement forwardly and rearwardly on the support arms so as to adjust the horizontal position of the beam relative to the cutting knife;
- the support arms having a forward and downward slope such that the beam moves downwardly as it slides forwardly;
- and a linkage responsive to the forward and downward sliding movement of the main elongate beam along the support arms for simultaneously and automatically causing a raising movement of the reel support arms only over a forward part of the sliding movement beyond a predetermined position;
- the linkage being arranged not to effect the raising movement over a part of the sliding movement rearward of the predetermined position;
- the linkage being arranged relative to a forward and downward slope of the arms such that, over the forward part of the movement, the beam moves substantially horizontally;
- the linkage being arranged to be readily dis-engageable and re-engageable such that, when disengaged the reel support arms are not raised as the beam undergoes the forward sliding movement.

10. The header according to claim 9 wherein the arms are straight so as to define a constant slope forwardly and downwardly.

11. The header according to claim 9 wherein each arm is lifted by an actuator having a first end connected to the frame and a second end connected to the arm and wherein the linkage includes a member connected between the second end and the arm so as to increase the effective length of the actuator.

12. The header according to claim 11 wherein the member connected between the second end and the arm is a bell crank.

13. The header according to claim 9 wherein the linkage includes a cable which is slack rearward of the predetermined position and becomes tensioned at the predetermined position.

* * * * *